3,072,637
Δ⁴-PREGNENE-20-IMINO DERIVATIVES AND PROCESS FOR THEIR PREPARATION

Oskar Jeger, Zurich, Switzerland, assignor to Ciba Corporation, a corporation of Delaware
No Drawing. Filed Dec. 21, 1959, Ser. No. 860,674
Claims priority, application Switzerland Jan. 16, 1959
13 Claims. (Cl. 260—239.5)

The invention is based on the observation that 18:20-imino-pregnane compounds can be obtained in a simple manner when 20-keto-pregnane and -allopregnane compounds are reacted with an aliphatic primary amine, the 20-imino compounds formed reduced to the 20-amino compounds and the latter in the form of the N-halogen compounds, subjected to pyrolysis. The process is illustrated in the following scheme of partial formulae

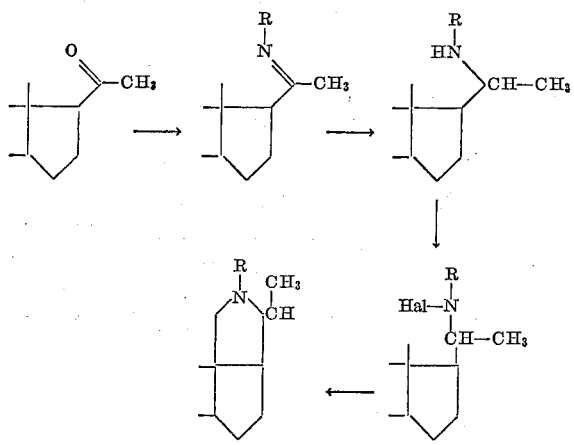

In these formulae R indicates an aliphatic hydrocarbon radical, for example a methyl group, and Hal a halogen atom, especially chlorine.

In carrying out the process the 20-keto-pregnane compounds are reacted with aliphatic primary amines, for example methylamine, in the presence of strong inorganic or organic bases. Suitable bases are, for example, alkali metal or alkaline earth metal alcoholates or hydroxides, especially sodium methylate, and also quaternary ammonium bases, for example benzyl-trimethyl-ammonium hydroxide. The reaction is advantageously carried out in a suitable solvent, for example in alcohols, or in excess of amine, and at elevated temperature under pressure.

For the reduction of the resulting 20-imino compounds nascent hydrogen is primarily suitable, as formed, for example, from alkali metals or alkaline earth metals and alcohols, for example sodium and ethanol. This reduction can also be carried out by means of metal hydrides, for example sodium-boron hydride or lithium-aluminum hydride.

The secondary 20-amino-pregnane compounds produced from the imines are converted into the corresponding 20-halogen-amino compounds. This conversion takes place by reaction with hypohalous acids, such as hypochlorous, hypobromous or hypoiodous acid, as obtained from chlorine, bromine or iodine and an alkali metal hydroxide, or from N-halogen-amides or -imides, for example N-chlor-, N-brom- or N-iodimide or -amide.

On heating, the N-halogen amino-pregnane compounds split off hydrogen halide with formation of the corresponding 18:20-imino-pregnane compounds. The pyrolysis is advantageously carried out with exclusion of air in a diluent, such as a high boiling hydrocarbon, for example mineral oil. The process can, however, be conducted without diluent, for example by heating under high vacuum. The temperature required for the pyrolysis is above 250° C. for example between 300° and 350° C.

The 20-keto-pregnanes and -allopregnanes employed as starting materials for the present process can contain further substituents, such as e.g. free, esterified or etherified hydroxyl groups or ketalized, or enolized oxo groups or oxime-, hydrazone- or semicarbazone- or alkyl groups, for example methyl groups. These substituents are present, for example, in the positions 2, 3, 4, 9, 11, 12, 16. Oxo groups in others than the 20-position must generally be protected prior to amination. However, 11-ketones can also be present in the free form. The starting materials can also possess double bonds in the ring system, for example in one or more of the positions 1, 4, 5, 9 (11), 11.

Among compounnds useful as starting materials there may be especially mentioned: 3β-hydroxy-20-oxo-allopregnane, 3α-hydroxy-20-oxo-pregnane, Δ⁵-3β-hydroxy-20-oxo-pregnene, progesterone, 11α-hydroxy-progesterone, 11-oxo-progesterone, and also 3- or 11-esters or 3-ketals, for example 3-ethylene ketals or the said compounds.

The 20-imino-pregnane compounds with an aliphatic hydrocarbon radical on the nitrogen atom, formed as intermediate products, are new. There may be especially mentioned the 20-methyl-imino compounds of 3β-hydroxy-20-oxo-allopregnane, 3α-hydroxy-20-oxo-pregnane, Δ⁵-3β-hydroxy-20-oxo-pregnene, progesterone, 11α-hydroxy-progesterone, 11-oxo-progesterone, and also their 3- or 11-esters or 3-ketals.

The 18:20-imino-pregnane compounds obtained as final products can be converted by the process of patent application Serial No. 859,576, filed December 15, 1959, into 18-oxygenated 20-oxo-pregnanes. As is shown in this application, $\Delta^{20\cdot N}$-18:20-imino-pregnenes may be obtained by treating an 18:20-imino-pregnane compound with a halogenating agent, for example, chlorosuccinimide, and treating the N-halogeno-compound formed with a base, such as an hydroxide or alcoholate of an alkali or alkaline earth metal; or by introducing the 20:N-double bond by direct dehydrogenation, for example, by means of mercury acetate. 18-oxygenated pregnane compounds are obtained in a simple manner by treating the desired $\Delta^{20\cdot N}$-18:20-imino-pregnene with nitrous acid and subsequently with an oxidizing agent.

The following example illustrates the invention:

Example 5 grams of Δ⁵-3β-acetoxy-20-oxo-pregnene are heated for 7 hours in a closed tube with a solution of 5 grams of methylamine in 25 cc. of absolute methanol and 25 cc. of sodium methylate, prepared by dissolving 1.5 grams of sodium in 25 cc. of methanol, to a temperature of 95–100° C. After working up, 4.1 grams of basic product are obtained which, in the crude state, melts at 221–222° C.

This product is Δ⁵-3β-acetoxy-20-methylimino-pregnene and without further purification it is dissolved in 100 cc. of absolute ethanol and reduced at boiling temperature by addition of 4 grams of sodium. By this means, in practically quantitative yield (3.5 grams) the Δ⁵-3β-hydroxy-20-methylamino-pregnene is produced. It is also obtainable starting from the above imine by reduction with sodium-boron hydride in absolute methanol or lithium-aluminum hydride in absolute tetrahydrofuran.

For conversion into Δ⁵-N-chloro-20α-N-methylamino-3β-hydroxy-pregnene 1 gram of Δ⁵-3β-hydroxy-20-methylamino-pregnene is dissolved in 100 cc. of absolute ether and chlorinated by means of N-chloro-succinimide. Especially good yields of the desired N-chloro compound are obtained by working with freshly purified and finely powdered chlorination reagent and accurately measuring out the quantity used (1.05 mols).

For ring closure, which leads to Δ⁵-3β-hydroxy-18:20- methylimino-pregnene, 1 gram of Δ⁵-N-chloro-20α-N-methylamino-3β-hydroxy-pregnene is suspended in 100 cc. of mineral oil and the suspension heated with exclusion of air for 30 minutes to 330–350° C. The pyrolysis can also be carried out without diluent but in that case it is preferable to work under high vacuum.

In an analogous manner other 20-oxo-pregnane compounds, for example progesterone-3-monoethylene ketal and 11-oxo-progesterone-3-monoethylene ketal, can be converted into the corresponding 18:20 methylimino compounds.

What is claimed is:

1. Process for the manufacture of imino-steroid compounds, wherein a 20-keto-pregnane compound is reacted with an aliphatic primary amine, the 20-imino compound formed is reduced to the 20-amino compound with a reducing reagent selected from the group consisting of nascent hydrogen and metal hydrides, and the latter in the form of an N-halogen compound subjected to pyrolysis at a temperature of above 250° C.

2. Process as claimed in claim 1, wherein a 20-keto-pregnane compound is reacted with methylamine, in the presence of a strong base.

3. Process as claimed in claim 2, wherein a 20-keto-pregnane compound is reacted with methylamine, in the presence of a light metal alcoholate.

4. Process as claimed in claim 1, wherein the resulting 20-imino-pregnane compounds are reduced to the corresponding 20-amino compounds by means of an alkali metal in the presence of an alcohol.

5. Process as claimed in claim 1, wherein the 20-halogen-amino compounds are subjected to pyrolysis by heating to 300–350° C.

6. Process as claimed in claim 1, wherein Δ⁵-3β-acetoxy-20-oxo-pregnene is used as starting material.

7. Process as claimed in claim 1, wherein progesterone-3-monoethylene-ketal is used as starting material.

8. Process as claimed in claim 1, wherein 11-oxo-progesterone-3-mono-ethylene-ketal is used as starting material.

9. 3β-hydroxy-20-methylimino-allopregnane.

10. Δ⁴-3-oxo-20-methylimino-pregnene.

11. A 3-ketal of Δ⁴-3-oxo-20-methylimino-pregnene.

12. A 3-ketal of Δ⁴-3:11-dioxo-20-methyleneimino-pregnene.

13. A compound of the formula

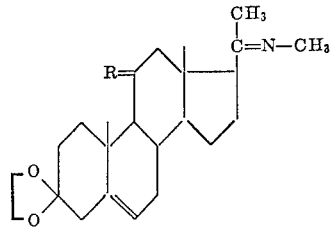

in which R represents a member selected from the group consisting of

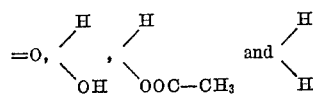

References Cited in the file of this patent

UNITED STATES PATENTS 2,582,258    Julian                Jan. 15, 1952
2,731,461    Ruschig et al.        Jan. 17, 1956

FOREIGN PATENTS 491,798      Great Britain         Sept. 8, 1938